US012063924B2

(12) United States Patent
Billingsley

(10) Patent No.: US 12,063,924 B2
(45) Date of Patent: Aug. 20, 2024

(54) BUG CAPTURE AND DISPOSAL DEVICE

(71) Applicant: Lena Billingsley, Raeford, NC (US)

(72) Inventor: Lena Billingsley, Raeford, NC (US)

( * ) Notice: Subject to any disclaimer, the term of this patent is extended or adjusted under 35 U.S.C. 154(b) by 105 days.

(21) Appl. No.: 17/901,276

(22) Filed: Sep. 1, 2022

(65) Prior Publication Data

US 2024/0074424 A1   Mar. 7, 2024

(51) Int. Cl.
*A01M 3/04* (2006.01)

(52) U.S. Cl.
CPC ..................... *A01M 3/04* (2013.01)

(58) Field of Classification Search
CPC .................. A01M 3/00; A01M 3/04
See application file for complete search history.

(56) References Cited

U.S. PATENT DOCUMENTS

| | | | | |
|---|---|---|---|---|
| 2,891,811 A * | 6/1959 | Strickler | ................ | A01M 3/00 15/105 |
| 7,065,919 B1 * | 6/2006 | Vierra | ................ | A01M 3/022 43/136 |
| 8,925,243 B1 * | 1/2015 | Vasquez | ................ | A01M 3/04 43/132.1 |
| 2006/0032112 A1 * | 2/2006 | George | ................ | A01M 3/022 43/114 |
| 2012/0311921 A1 * | 12/2012 | Ogilvie | ................ | A01M 3/00 43/132.1 |
| 2017/0361638 A1 * | 12/2017 | Seth | ................ | B32B 7/12 |

* cited by examiner

*Primary Examiner* — Brady W Frazier
*Assistant Examiner* — Shanna Danielle Glover

(57) ABSTRACT

A bug capture and disposal device includes a shaft having a working end opposite a handle end. A head plate is affixed to the working end and a pair of flaps are pivotally affixed along opposing sides of the head plate. The pair of flaps are selectively movable between an open position and a closed position. A rod is disposed within an interior of the shaft and is operably connected to a control disposed on the handle end and each flap of the pair of flaps. Upon actuation of the control, the rod moves the pair of flaps towards the closed position. A retraction control is slidably disposed on the shaft, wherein the retraction control is operably connected to the rod, whereupon actuation of the retraction control, the pair of flaps towards the open position. An adhesive pad is removably secured to an underside of the pair of flaps.

17 Claims, 7 Drawing Sheets

BUG CAPTURE AND DISPOSAL DEVICE

BACKGROUND OF THE INVENTION

The present invention relates to bug capture devices. More particularly, the present invention pertains to a bug capture device that adheres the bug to an adhesive pad, which can then be sealed about the bug for disposal after capture.

Insects, spiders, or other bugs are often a nuisance, particularly when in someone's home or place of business. Bugs can be a source of distress and unsanitary conditions and must often be removed in order to ensure an individual's peace of mind or general hygiene practices. Many people may be squeamish around insects or have phobias related to insects, which can make disposal of such insects difficult to manage without outside assistance. Additionally, many traditional methods of insect disposal result in crushing the insect, which can result in further unsanitary conditions, as various secretions or parts of the insect may be further transferred or spread across various surfaces. Alternatively, catching and releasing bugs without killing them can be particularly difficult, whether due to feelings of discomfort around those bugs, or an inability to move quickly enough to approach and trap the bug. Furthermore, traps that rely on enticing insects to approach can prove to be ineffective or present an unattractive appearance. Therefore, a device that can allow a user to quickly capture an insect, spider, bug, or other pest from a distance without crushing the insect to avoid further contamination of the area is desired.

In light of the devices disclosed in the known art, it is submitted that the present invention substantially diverges in design elements from the known art and consequently it is clear that there is a need in the art for an improvement to existing bug capture devices. In this regard, the instant invention substantially fulfills these needs.

SUMMARY OF THE INVENTION

In view of the foregoing disadvantages inherent in the known types of bug capture devices now present in the known art, the present invention provides a bug capture and disposal device wherein the same can be utilized for providing convenience for the user when capturing and disposing of insects, bugs, or other pests without crushing the insect, while also encapsulating the insect within a disposable adhesive pad to prevent the user from seeing the captured insect.

The present system comprises a shaft having a working end opposite a handle end, wherein a head plate is affixed to the working end. A pair of flaps are pivotally affixed to the working end along opposing sides of the head plate, wherein the pair of flaps are selectively movable between an open position and a closed position. The pair of flaps are coplanar when disposed in the open position, and parallel when in the closed position. A rod is disposed within an interior of the shaft, wherein the rod is operably connected to a control disposed on the handle end and each flap of the pair of flaps. Upon actuation of the control, the rod moves towards the working end to move the pair of flaps towards the closed position. A retraction control is slidably disposed on the shaft, wherein the retraction control is operably connected to the rod. Upon actuation of the retraction control, the rod moves towards the handle end to move the pair of flaps towards the open position. An adhesive pad is removably secured to an underside of the pair of flaps, wherein an entirety of a lower surface of the adhesive pad comprises an adhesive thereon.

In some embodiments, each flap of the pair of flaps includes a perimeter lip extending about opposing lateral sides and a distal side of the flap, wherein the distal side is defined opposite the head plate, such that the perimeter lip defines an interior volume between the pair of flaps when in the closed position. In another embodiment, a foam insert is affixed to an interior surface of each flap of the pair of flaps, wherein the adhesive pad is removably secured to an exterior surface of the foam inserts. In other embodiments, a connector is disposed at a lower end of the rod, wherein the connector further comprises a pair of guide rods extending therefrom and affixed to each of the pair of flaps. In yet another embodiment, the retraction control comprises a pair of grip sections disposed on opposing sides of the shaft and affixed together by a pair of posts extending through the shaft, wherein the pair of posts engage the rod to selectively move the rod between an elevated position and a lowered position. In some embodiments, the rod comprises a serpentine section defining a plurality of curves offset from a longitudinal axis of the rod, wherein the pair of posts operably engage notches defined within the plurality of curves. In another embodiment, the handle comprises an upper portion and a lower portion, wherein the upper portion is angularly offset from the lower portion. In other embodiments, the control is disposed between the upper portion and the lower portion of the handle. In yet another embodiment, the handle comprises a plurality of raised grip elements across an exterior surface thereof. In some embodiments, the opposing sides of the head plate define a central apex extending distally from the shaft. In other embodiments, a recess is defined within each of the pair of flaps, wherein the recess is dimensioned to receive the head plate therein such that an upper surface of each of the pair of flaps rests flush with an upper surface of the head plate when the pair of flaps are in the open position. In yet another embodiment, each of the pair of grip sections of the retraction control comprises an upper protrusion and a plurality of raised grip elements on an exterior surface thereof. In some embodiments, a spring retaining housing is disposed within the shaft such that the rod extends therethrough, wherein the spring retaining housing defines an upper section and a lower section separated by an interior flange, wherein a spring is disposed within the lower section. In another embodiment, the rod further comprises an upper stopper and a lower stopper affixed thereto, wherein the upper stopper is disposed on an upper side of the interior flange and the lower stopper is disposed on a lower side of the interior flange opposite the spring, such that the lower stopper retains the spring in a compressed position when the rod is in an elevated position, and the upper stopper engages the interior flange when the rod is in a lowered position. In other embodiments, a latch member is pivotally secured within the handle and operably connected to the control and the rod, wherein the latch member includes a head having a lip configured to engage the upper stopper when the rod is in the elevated position, and a tail configured to engage the control, such that when the control is actuated, the latch member pivots and the lip disengages the upper stopper to release the rod to move to the lowered position. In yet another embodiment, the head of the latch member includes a beveled lower end. In some embodiments, a base of the control comprises a pair of retention flanges disposed about a circumference thereof, wherein the tail of the latch member is engaged between the pair of retention flanges. In another embodiment, the adhesive pad comprises a tab extending therefrom, wherein the tab extends beyond a perimeter of the pair of flaps when the adhesive pad is secured thereto. In other embodiments, a pair of parallel adhesive strips are disposed on an upper surface of the adhesive pad, wherein the pair of parallel adhesive strips are configured to removably secure the adhesive pad to the underside of the pair of flaps. In yet another embodiment, a removable contact sheet is disposed over the lower surface of the adhesive pad and each of the pair of parallel adhesive strips.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
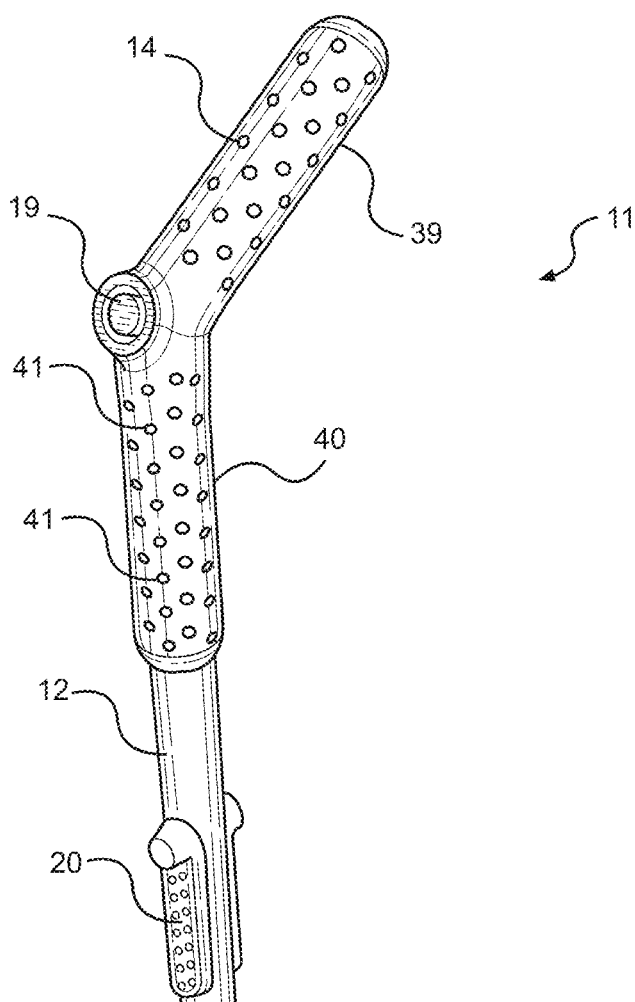
FIG. 1A shows a perspective view of an embodiment of the bug capture and disposal device with flaps in an open position

Reference is made herein to the attached drawings. Like reference numerals are used throughout the drawings to depict like or similar elements of the bug capture and disposal device. The figures are intended for representative purposes only and should not be considered to be limiting in any respect.

Figure 1B:
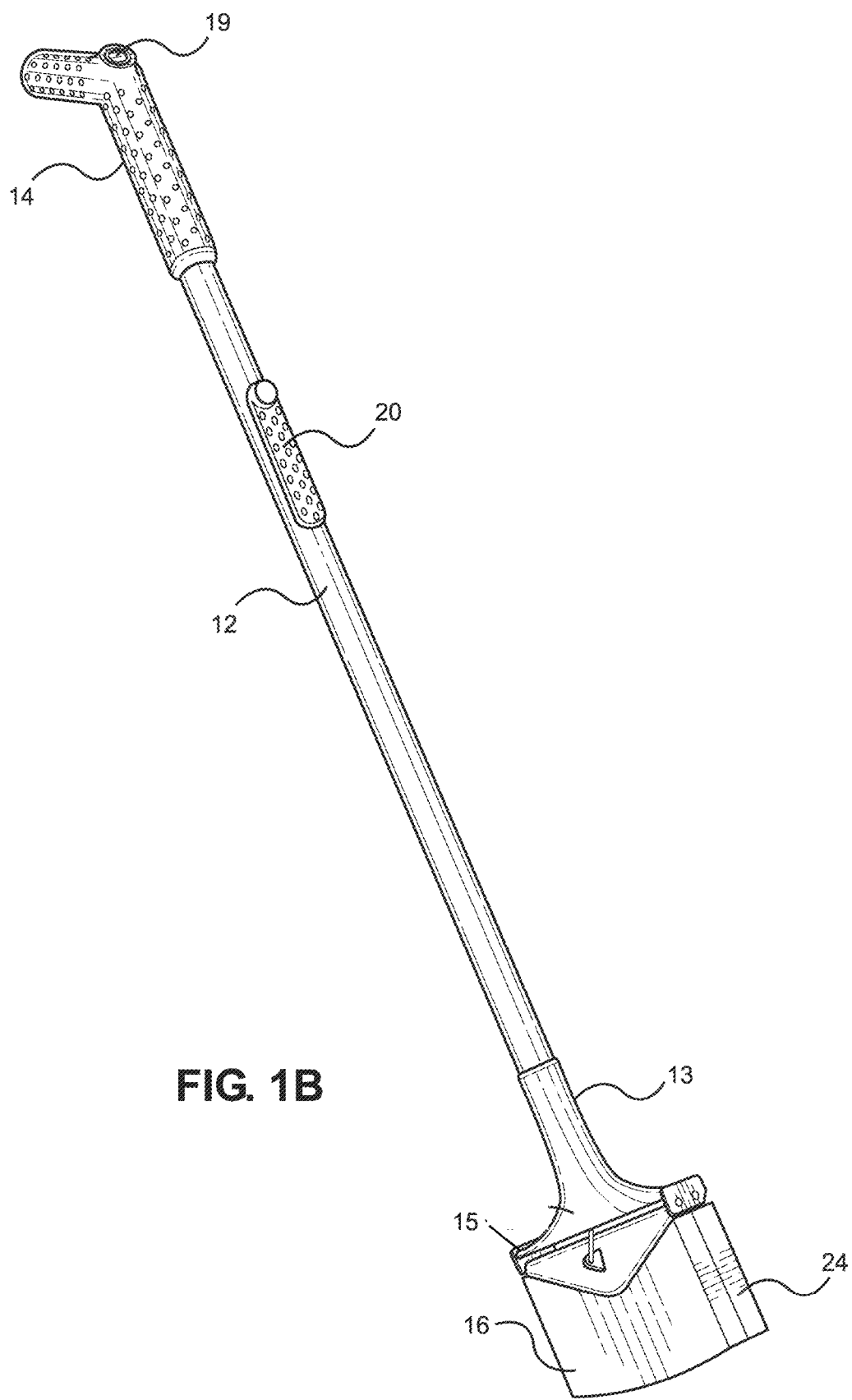
FIG. 1B shows a perspective view of an embodiment of the bug capture and disposal device with flaps in a closed position.
Figure 2:
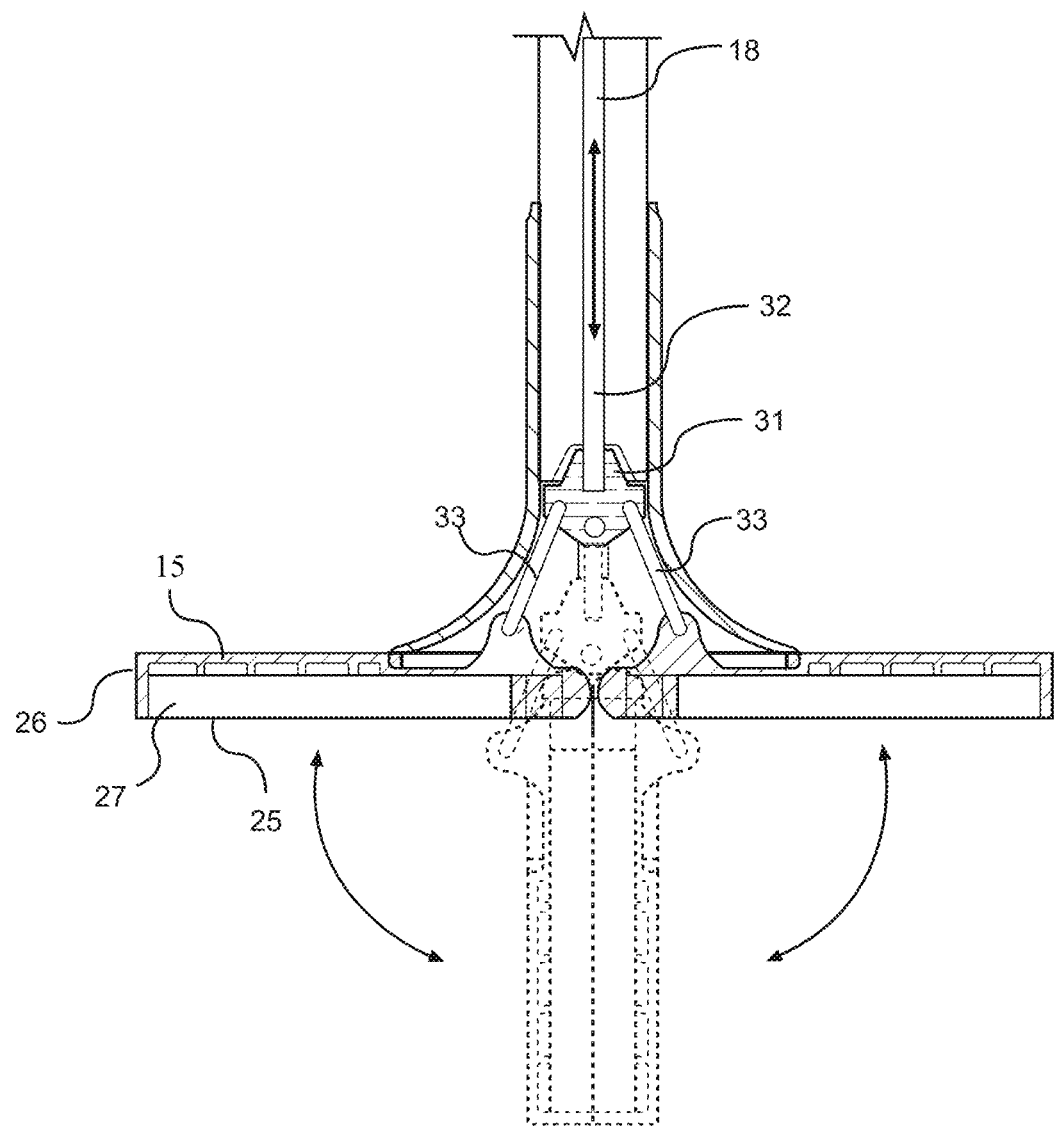
FIG. 2 shows a cross-sectional view of the working end of an embodiment of the bug capture and disposal device.

Referring now to FIGS. 1A and 1B, there is shown a perspective view of an embodiment of the bug capture and disposal device with flaps in an open position and a perspective view of an embodiment of the bug capture and disposal device with flaps in a closed position, respectively. The bug capture and disposal device 11 comprises a shaft 12 having a working end 13 disposed opposite a handle end 14, wherein the working end 13 includes a head plate 15 thereon. The head plate 15 further includes a pair of flaps 16 pivotally affixed thereto along opposing sides 17 of the head plate 15, wherein the pair of flaps 16 are configured to selectively move between an open position (as shown in FIG. 1A) and a closed position (as shown in FIG. 1B). In the open position, the pair of flaps 16 are disposed in a coplanar orientation perpendicular to a longitudinal axis of the shaft, such that the working end 13 defines a substantially flat surface for placement on a floor, counter, or other flat surface. When the pair of flaps 16 are disposed in the closed position, the pair of flaps 16 are in contact with each other along an interior surface thereof. In the illustrated embodiment, each flap of the pair of flaps 16 comprises a perimeter lip 24 about three sides thereof, so as to define an interior volume (as shown in FIG. 2, 27) therebetween, such that when in the closed position, the perimeter lips 24 of each flap of the pair of flaps 16 are in contact with each other along an entire length thereof. The interior volume is configured to contain an insect therein when the pair of flaps 16 are in the closed position, such that the insect is captured by an adhesive pad (as shown in FIG. 3, 21) affixed therein for later disposal as further described elsewhere herein.

In the illustrated embodiment, the handle end 14 comprises an upper portion 39 and a lower portion 40, wherein the upper portion 39 is angularly offset from the lower portion 40. In this manner, the handle end 14 defines an ergonomic gripping surface to provide increased comfort and usability. Furthermore, in the shown embodiment, a plurality of elevated grip elements 41 are disposed along an exterior surface of the handle end 14 along the upper and lower portions 39, 40, wherein the plurality of elevated grip elements 41 are configured to increase surface area in contact with the user's hand to increase frictional engagement therewith. A control 19 is disposed on the handle end 14, wherein the control 19 is configured to selectively move the pair of flaps 16 from the open position to the closed position when actuated. In the illustrated embodiment, the control 19 comprises a push button that deploys the pair of flaps 16 to the closed position when depressed, however, alternate controls capable of performing a similar function are also contemplated. In the shown embodiment, the control 19 is disposed between the upper portion 39 and the lower portion 40 of the handle end 14, such that the control 19 can be easily located at a natural grasping location during use. A retraction control 20 is slidably disposed along the shaft 12, wherein the retraction control 20 is operably connected to the pair of flaps 16, such that upon actuation, the pair of flaps 16 transition from the closed position to the open position. The bug capture and disposal device 11 is contemplated to remain in each of the open and closed positions until an independent control is actuated to transition to the desired position. In this manner, once deployed to the closed position upon placement over an insect, the insect is retained within the working end 13 of the bug capture and disposal device 11.

Referring now to FIG. 2, there is shown a cross-sectional view of the working end of an embodiment of the bug capture and disposal device. A rod 18 is disposed within an interior of the shaft and operably connected to each of the control and the pair of flaps 16. The rod 18 is configured to selectively move between an elevated position corresponding to an open position of the pair of flaps 16 and a lowered position corresponding to the closed position of the pair of flaps 16. In the shown embodiment, a connector 31 is affixed to a lower end 32 of the rod 18, wherein the connector 31 further comprises a pair of guide rods 33 thereon. A guide rod of the pair of guide rods 33 is affixed to each flap of the pair of flaps 16 via a bracket affixed to an upper surface of the pair of flaps 16. Upon the rod 18 moving to the lowered position, the connector 31 lowers the pair of guide rods 33 which in turn pivot the pair of flaps 16 to the closed position. In the shown embodiment, to facilitate this pivoting movement, an interior edge of each flap of the pair of flaps 16 comprises an arcuate edge in contact with the interior edge of the adjacent flap. In the illustrated embodiment, the pair of flaps 16 each includes a perimeter lip disposed about three sides thereof, wherein the perimeter lip extends perpendicularly from each of a distal side 26 of each flap and each opposing lateral side 25 of each flap defining an interior volume 27. As shown, when in the closed position, the perimeter lips of each flap contact each other along an entire length thereof to encapsulate each interior volume 27. In some embodiments, a foam insert (as shown in FIG. 3, 28) is contemplated to be affixed to an interior surface of each flap, such that the foam insert fills the interior volume 27.

Figure 3:
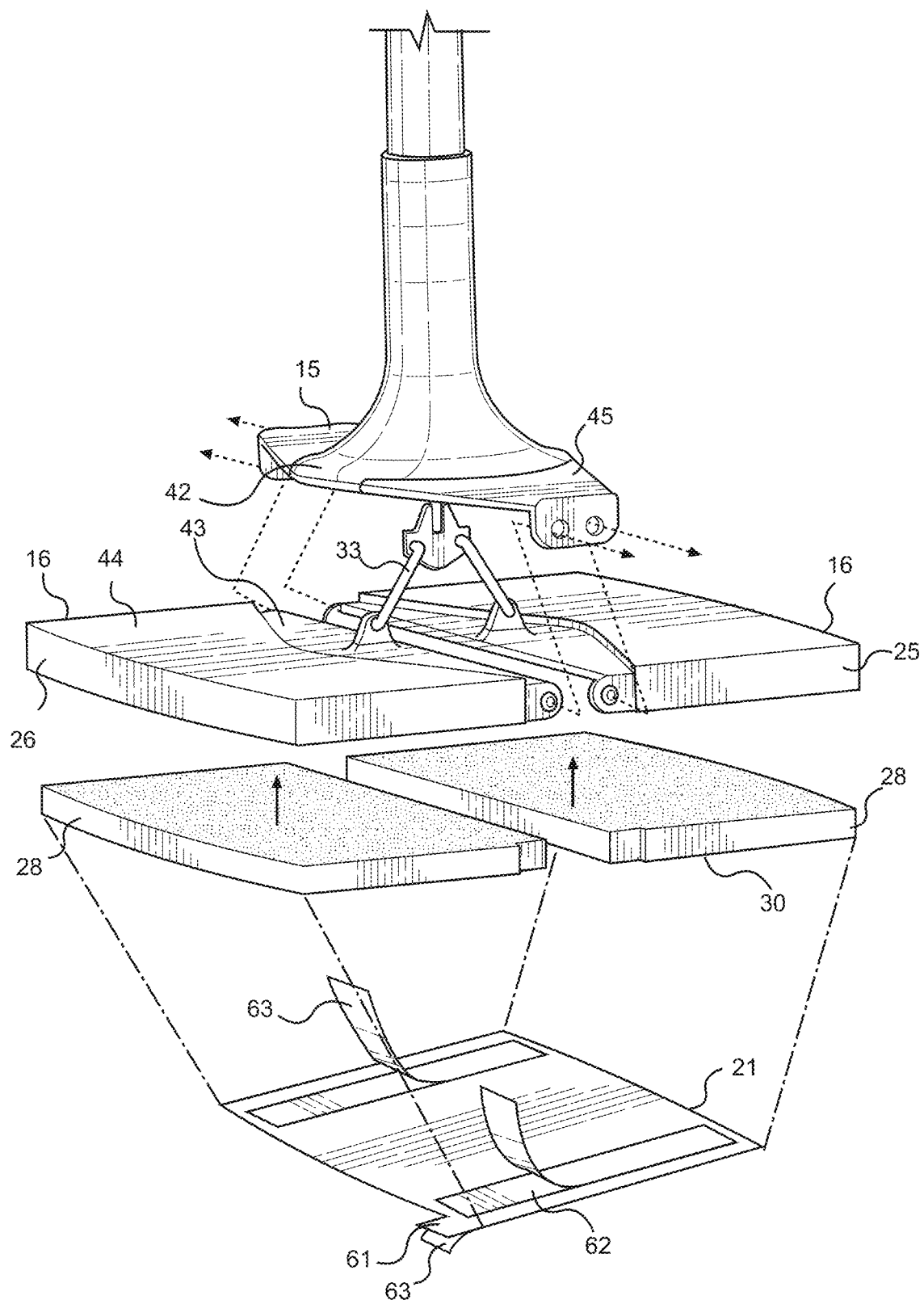
FIG. 3 shows an exploded view of the working end of an embodiment of the bug capture and disposal device.

Referring now to FIG. 3, there is shown an exploded view of the working end of an embodiment of the bug capture and disposal device. In the shown embodiment, the pair of flaps 16 are pivotally affixed to the head plate 15 via fasteners inserted through a perpendicular bracket extending from a front and rear side of the head plate 15. Once secured in this manner, the pair of flaps 16 are selectively movable between the open position and the closed position via actuation of the control to move the rod and associated pair of guide rods 33 to the lowered position. In the shown embodiment, the opposing sides of the head plate 15 define a substantially triangular shape having a central apex 42, such that the connection point between the pair of guide rods 33 and the pair of flaps 16 is disposed further from a longitudinal axis of the shaft. In this manner, the force required to move the pair of flaps 16 between the open position and the closed position is reduced. In the shown embodiment, the pair of flaps 16 include a recess 43 therein, wherein the recess is dimensioned to receive the head plate 15 therein such that an upper surface 44 of the pair of flaps 16 rests flush with an upper surface 45 of the head plate 15 when the pair of flaps 16 are in the open position. In the shown embodiment, the perimeter lip extends from the opposing lateral sides 25 and distal side 26 of the pair of flaps 16 to define the interior volume into which the foam inserts 28 can be inserted. In the shown embodiment, the foam inserts 28 are affixed to the interior surface of each of the pair of flaps 16 and comprise a height equivalent to the height of the perimeter lip, such that an exterior surface 30 of the foam inserts 28 rests flush with the perimeter lip. The foam inserts 28 comprise a soft and compressible foam material having a large porosity, such that upon placement of the working end of the bug capture and disposal device over an insect, the foam inserts 28 compress to prevent crushing the insect and spreading secretions over a surface.

An adhesive pad 21 is removably secured to the working end, wherein the adhesive pad 21 includes an adhesive across an entirety of a lower surface thereof. In this manner, once the working end is placed over the insect, the insect is restrained by the adhesive disposed on the adhesive pad 21. In the shown embodiment, the adhesive pad 21 is removably securable to the exterior surface 30 of the foam inserts 28, such that the adhesive pad 21 can compress inwardly upon contact with an insect to cushion the force applied to the insect. After capture, the user can then move the pair of flaps 16 to the closed position to fold the adhesive pad 21 in half, sealing the insect between the joined halves of the adhesive lower surface of the adhesive pad 21. In the shown embodiment, the adhesive pad 21 further comprises a pair of adhesive strips 62 disposed across an upper surface of the adhesive pad 21, wherein the pair of adhesive strips 62 comprise a smaller surface area than that of the lower surface of the adhesive pad 21. In this manner, the force of adhesion between the adhesive pad 21 and the foam inserts 28 is less than the force of adhesion between the joined halves of the lower surface of the adhesive pad 21. Thus, upon the pair of flaps 16 being moved from the closed position to the open position after capturing an insect therebetween, the pair of adhesive strips 62 release from the foam inserts 28 rather than pulling the lower surface of the adhesive pad 21 apart after sealing the insect therebetween. In the illustrated embodiment, a tab 61 extends from an edge of the adhesive pad 21, wherein the tab 61 extends beyond a perimeter of the pair of flaps 16 when the adhesive pad 21 is secured to the working end. In this manner, the tab 61 provides a gripping surface for the user for removing the adhesive pad 21 from the working end when an insect has been captured thereby. In some embodiments, the tab 61 lacks adhesive thereon to prevent the adhesive pad 21 from adhering to the user's fingers. Furthermore, in the shown embodiment, each of the lower surface of the adhesive pad 21 and the pair of adhesive strips 62 comprise a removable contact sheet 63 thereon, wherein the removable contact sheet 63 overlies the adhesive until use. In this manner, the removable contact sheet 63 prevents particulate, other materials, or evaporation of volatile compounds from reducing the effectiveness of the adhesive before use.

Figure 4B:
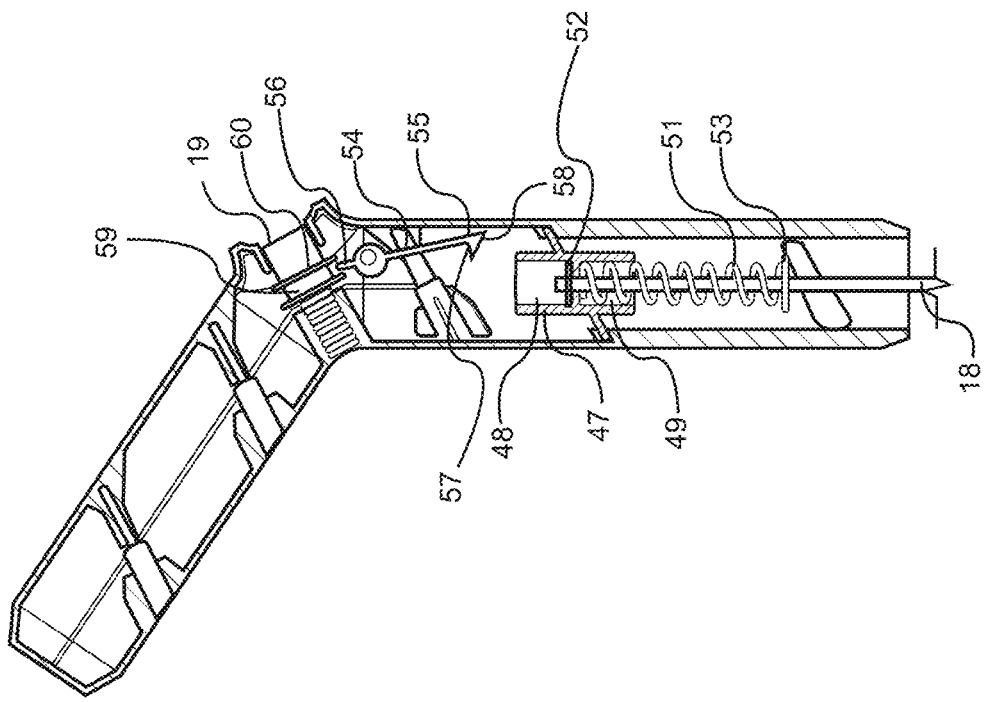
FIG. 4B shows a cross-sectional view of the handle of an embodiment of the bug capture and disposal device with the rod in a lowered position.
Figure 4A:
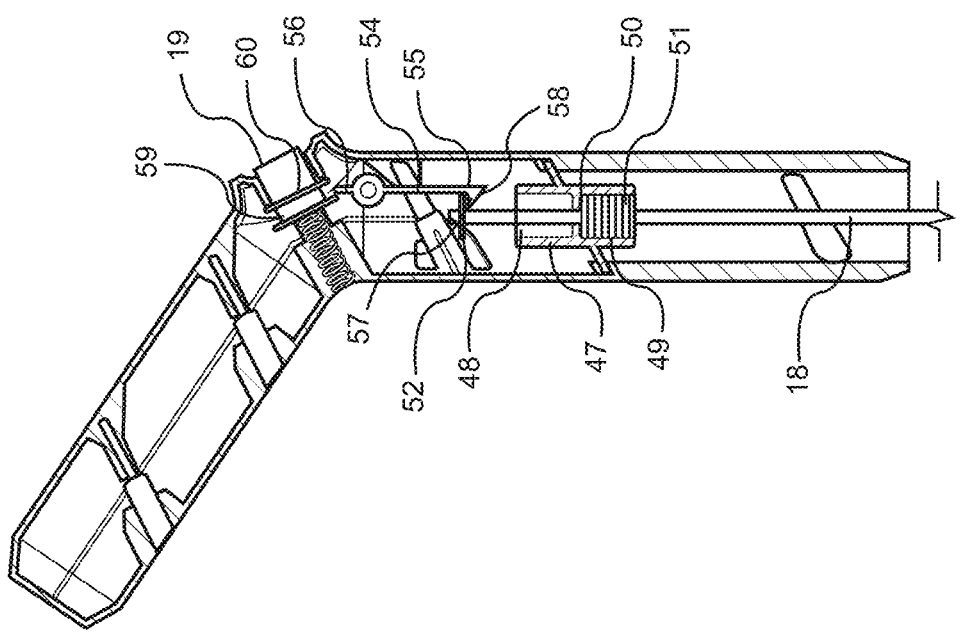
FIG. 4A shows a cross-sectional view of the handle of an embodiment of the bug capture and disposal device with the rod in an elevated position.

Referring now to FIGS. 4A and 4B, there is shown a cross-sectional view of the handle of an embodiment of the bug capture and disposal device with the rod in an elevated position and a cross-sectional view of the handle of an embodiment of the bug capture and disposal device with the rod in a lowered position, respectively. In the illustrated embodiment, a spring housing 47 is disposed within the handle end of the bug capture and disposal device, wherein the spring housing 47 includes an upper section 48 and a lower section 49 separated by an interior flange 50 therebetween. The interior flange 50 includes an aperture therethrough wherein the rod 18 extends through the aperture and the spring housing 47. In the shown embodiment, an upper stopper 52 is affixed to the rod 18 above the interior flange 50, whereupon placement of the rod 18 is in a lowered position (as shown in FIG. 4B) the upper stopper 52 is disposed within the upper section 48 and rests flush against an upper surface of the interior flange 50 to retain the rod 18 within the interior of the shaft. A spring 51 is disposed about the rod between the interior flange 50 and a lower stopper 53, such that when the rod 18 is in the elevated position (as shown in FIG. 4A) the spring 51 is compressed between the interior flange 50 and the lower stopper 53. In this manner, when the rod 18 is actuated by the control 19 as further described elsewhere herein, the spring 51 extends driving the rod 18 towards the lowered position, which in turn moves the pair of flaps to the closed position.

In the shown embodiment, a latch member 54 is pivotally connected within the handle end and operably connected to each of the control 19 and the rod 18, whereupon actuation of the control 19, the rod 18 is released allowing the spring 51 to drive the rod 18 to the lowered position. The latch member 54 includes a head 55 disposed opposite a tail 56, wherein the head 55 and the tail 56 are disposed opposite a pivot point of the latch member 54. The head 55 of the latch member 54 engages the upper stopper 52 when the rod 18 is in the elevated position. The tail 56 of the latch member 54 is operably connected to the control 19, such that when the control 19 is actuated, the tail 56 moves about the pivot point to move the head 55 of the latch member 54. In the shown embodiment, the control 19 is spring-biased and includes a pair of retention flanges 60 disposed about a base 59 of the control 19, wherein the tail 56 is frictionally engaged between the pair of retention flanges 60. Upon depression of the control 19, the retention flanges 60 pivot the latch member 54 via the tail 56, thereby disengaging the head 55 from the rod 18. In this manner, the spring-biased nature of the control 19 is transferred to the latch member 54, such that the latch member 54 returns to engage the rod 18 when the control 19 is released. In the shown embodiment, the head 55 of the latch member 54 further comprises a lip 57 defined perpendicular to a longitudinal axis of the latch member 54, wherein the lip 57 is configured to frictionally engage a lower surface of the upper stopper 52. In the illustrated embodiment, a lower end of the head 55 of the latch member 54 comprises a beveled surface, such that upon retraction of the rod 18 towards the elevated position, the upper stopper 52 slides along the beveled surface to engage the lip 57 extending from the head 55.

Figure 5:
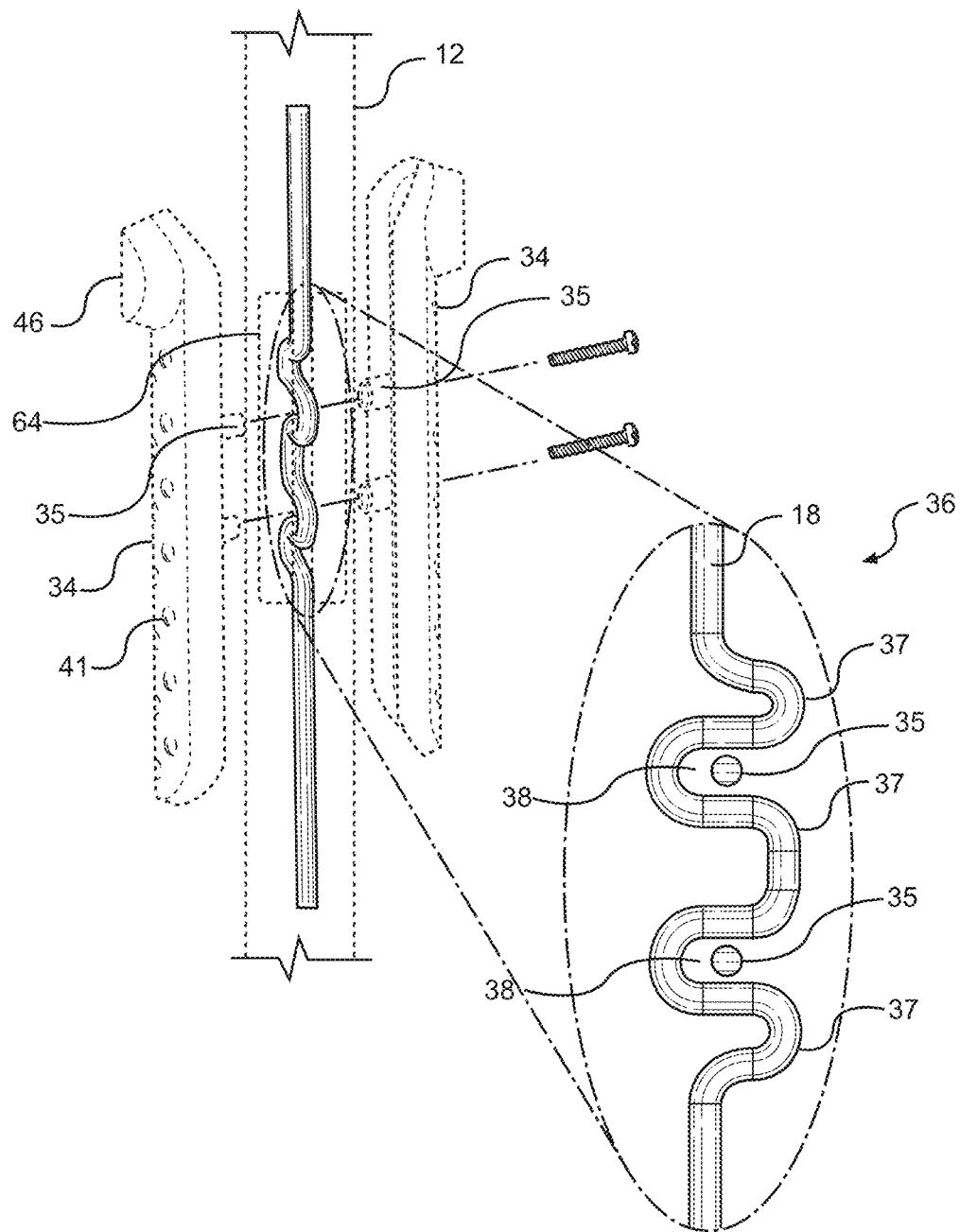
FIG. 5 shows an exploded view of the retraction control of an embodiment of the bug capture and disposal device.

Referring now to FIG. 5, there is shown an exploded view of the retraction control of an embodiment of the bug capture and disposal device. In the illustrated embodiment, shaft 12 further comprises a pair of opposed slots 64 disposed therethrough, wherein the pair of slots 64 are configured to slidably secure the retraction control thereto. In the shown embodiment, the retraction control comprises pair of grip sections 34 disposed on opposing sides of the shaft 12, wherein an interior surface of the pair of grip sections 34 comprise an arcuate surface configured to conform to the substantially cylindrical shaft 12. In the shown embodiment, the pair of grip sections 34 include a pair of inwardly projecting posts 35 extending from an interior surface thereof, wherein the pair of posts 35 extend into the interior of the shaft to engage the rod 18. In this manner, the movement of the retraction control translates directly to movement of the rod 18 between the lowered and elevated positions. In the shown embodiment, the pair of grip sections 34 further comprise an upper protrusion 46 extending therefrom, wherein the upper protrusion 46 provides an increased surface area perpendicular to the direction of movement of the retraction control, such that the user can more directly and comfortably apply force upwardly to compress the spring and return the rod 18 to the elevated position. Additionally, to further increase frictional engagement between the pair of grip sections 34 and the user, the pair of grip sections 34 include a plurality of raised grip elements 41 thereon, similar to the upper and lower portions of the handle end as previously described.

In the shown embodiment, the rod 18 further comprises a serpentine section 36 defining a plurality of curves 37 therein, wherein the plurality of curves 37 are offset from the longitudinal axis of the rod 18. The plurality of curves 37 are further disposed in a coplanar orientation relative to each other, such that the serpentine section 36 lies along a single plane. The plurality of curves 37 further define notches 38 therein, wherein the notches 38 receive the pair of posts 35. The notches 38 are defined between parallel portions of the plurality of curves 37, wherein the parallel portions are disposed perpendicular to the longitudinal axis of the rod 18. In this manner, the serpentine section 36 captures the pair of posts 35 allowing the user to transfer the upward motion of the pair of grip sections 34 of the retraction control to the rod 18, allowing the user to reset the spring and the rod 18 to the elevated position which in turn returns the pair of flaps to the open position.

Figure 6:
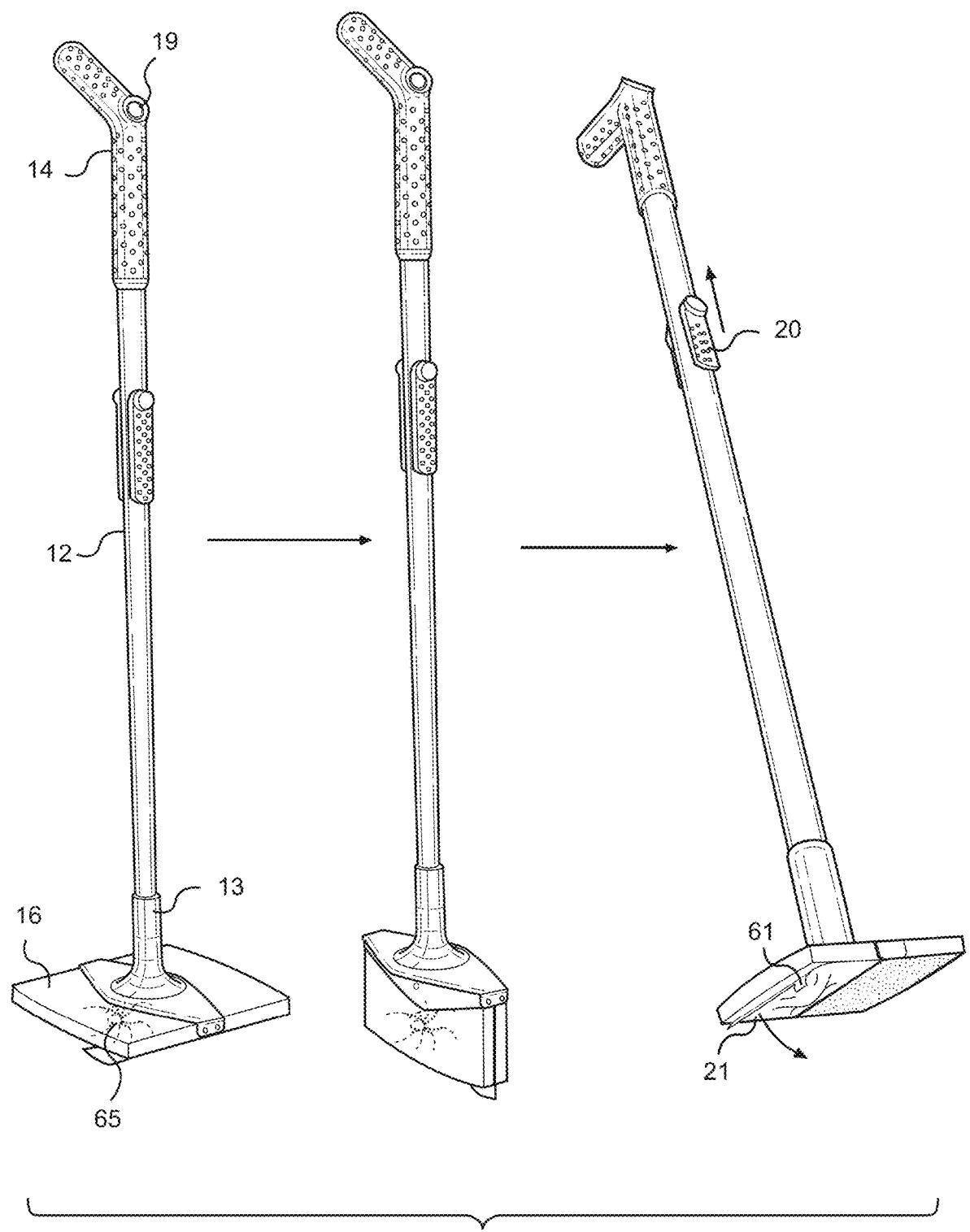
FIG. 6 shows a perspective view of an embodiment of the bug capture and disposal device in use.

Referring now to FIG. 6, there is shown a perspective view of an embodiment of the bug capture and disposal device in use. In one use, the user affixes an adhesive pad 21 to a lower surface of the working end 13 of the bug capture and disposal device and peels any removable contact sheets from the adhesive surfaces before use. The user can then grasp the handle end 14 of the bug capture and disposal device and places the working end 13 over a bug 65 that has been identified on a surface. The user can then press gently to compress the foam inserts and adhere the bug 65 to the adhesive lower surface of the adhesive pad 21 without crushing the bug 65. Once adhered, the user can actuate the control 19 to release the rod within the interior of the shaft 12, whereupon the pair of flaps 16 close about the bug 65, thereby sealing the two halves of the adhesive pad 21 together about the bug 65. The user can then actuate the retraction control 20 upward along the shaft 12 to move the pair of flaps 16 to the open position. As the sealed lowered surface of the adhesive pad 21 comprises a greater adhesion force than that securing the adhesive pad 21 to the foam inserts, the adhesive pad remains closed around the bug 65. In this manner, the bug 65 is completely isolated from the user, thereby ensuring that any squeamishness or phobia can be minimized. The user can then peel the adhesive pad 21 from the working end 13 via the tab 61 and dispose of the adhesive pad 21 in a garbage container or other means of disposal. The user may then secure a new adhesive pad 21 to the working end 13 for a subsequent use, or otherwise store the device without a new adhesive pad 21. In this manner, the user can safely and securely capture and dispose of insects or other pests without crushing them creating more unsanitary conditions, and while maintaining a sufficient distance and isolation from the insect to avoid triggering undesirable phobias or discomfort from close contact with insects.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bug capture and disposal device, comprising:
   a shaft having a working end opposite a handle end of a handle;
   a head plate affixed to the working end;
   a pair of flaps pivotally affixed to the working end along opposing sides of the head plate;
   wherein the pair of flaps are selectively movable between an open position and a closed position;
   wherein the pair of flaps are coplanar when disposed in the open position and parallel when in the closed position;
   a rod disposed within an interior of the shaft, wherein the rod is operably connected to a control disposed on the handle end and each flap of the pair of flaps;
   whereupon actuation of the control, the rod moves towards the working end to move the pair of flaps towards the closed position;
   a retraction control slidably disposed on the shaft, wherein the retraction control is operably connected to the rod;

whereupon actuation of the retraction control, the rod moves towards the handle end to move the pair of flaps towards the open position;

an adhesive pad removably secured to an underside of the pair of flaps;

wherein an entirety of a lower surface of the adhesive pad comprises an adhesive thereon; and further comprising a connector disposed at a lower end of the rod, wherein the connector further comprises a pair of guide rods extending therefrom and affixed to each of the pair of flaps.

2. The bug capture and disposal device of claim 1, wherein the retraction control comprises a pair of grip sections disposed on opposing sides of the shaft and affixed together by a pair of posts extending through the shaft, wherein the pair of posts engage the rod to selectively move the rod between an elevated position and a lowered position.

3. The bug capture and disposal device of claim 2, wherein the rod comprises a serpentine section defining a plurality of curves offset from a longitudinal axis of the rod, wherein the pair of posts operably engage notches defined within the plurality of curves.

4. The bug capture and disposal device of claim 1, wherein the handle comprises an upper portion and a lower portion, wherein the upper portion is angularly offset from the lower portion.

5. The bug capture and disposal device of claim 4, wherein the control is disposed between the upper portion and the lower portion of the handle.

6. The bug capture and disposal device of claim 1, wherein the handle comprises a plurality of raised grip elements across an exterior surface thereof.

7. The bug capture and disposal device of claim 1, wherein the opposing sides of the head plate define a central apex extending distally from the shaft.

8. The bug capture and disposal device of claim 1, further comprising a recess defined within each of the pair of flaps, wherein the recess is dimensioned to receive the head plate therein such that an upper surface of each of the pair of flaps rests flush with an upper surface of the head plate when the pair of flaps are in the open position.

9. The bug capture and disposal device of claim 2, wherein each of the pair of grip sections of the retraction control comprises an upper protrusion and a plurality of raised grip elements on an exterior surface thereof.

10. The bug capture and disposal device of claim 1, further comprising a spring retaining housing disposed within the shaft such that the rod extends therethrough, wherein the spring retaining housing defines an upper section and a lower section separated by an interior flange, wherein a spring is disposed within the lower section.

11. The bug capture and disposal device of claim 10, wherein the rod further comprises an upper stopper and a lower stopper affixed thereto, wherein the upper stopper is disposed on an upper side of the interior flange and the lower stopper is disposed on an lower side of the interior flange opposite the spring, such that the lower stopper retains the spring in a compressed position when the rod is in an elevated position, and the upper stopper engages the interior flange when the rod is in a lowered position.

12. The bug capture and disposal device of claim 11, further comprising a latch member pivotally secured within the handle and operably connected to the control and the rod, wherein the latch member includes a head having a lip configured to engage the upper stopper when the rod is in the elevated position, and a tail configured to engage the control, such that when the control is actuated, the latch member pivots and the lip disengages the upper stopper to release the rod to move to the lowered position.

13. The bug capture and disposal device of claim 12, wherein the head of the latch member includes a beveled lower end.

14. The bug capture and disposal device of claim 12, wherein a base of the control comprises a pair of retention flanges about a circumference thereof, wherein the tail of the latch member is engaged between the pair of retention flanges.

15. The bug capture and disposal device of claim 1, wherein the adhesive pad comprises a tab extending therefrom, wherein the tab extends beyond a perimeter of the pair of flaps when the adhesive pad is secured thereto.

16. The bug capture and disposal device of claim 1, further comprising a pair of parallel adhesive strips disposed on an upper surface of the adhesive pad, wherein the pair of parallel adhesive strips are configured to re movably secure the adhesive pad to the underside of the pair of flaps.

17. The bug capture and disposal device of claim 16, further comprising a removable contact sheet disposed over the lower surface of the adhesive pad and each of the pair of parallel adhesive strips.

\* \* \* \* \*